United States Patent Office 3,369,974
Patented Feb. 20, 1968

3,369,974
PRODUCTION OF LYCOPENE
Leon Ninet and Jacques Albert Renaut, Paris, and Robert Charles Francois Tissier, Maisons Alfort, France, assignors to Rhone-Poulenc S.A., Paris, France, a corporation of France
No Drawing. Filed May 10, 1965, Ser. No. 454,654
Claims priority, application France, May 14, 1964, 974,548
4 Claims. (Cl. 195—28)

ABSTRACT OF THE DISCLOSURE

Improved yields are obtained in the production of lycopene by the fermentation of the + and − forms of *Blakeslea trispora* if the fermentation is effected in the presence of a heterocyclic compound selected from the class consisting of imidazole, mono- and di (lower alkyl) imidazole, pyridine, mono-, di- and tri (lower alkyl) pyridines, (lower alkanoyl) amino-imidazole, morpholine, piperidine, creatinine, compounds in which two such heterocyclic nuclei are linked by a single bond, and compounds in which two such heterocyclic nuclei are linked by a carbonyl group.

---

The present invention relates to the production of lycopene.

It is known to obtain lycopene from various vegetable or microbic sources, but, by reason of the low contents found in these various sources and the presence of many other carotenoids, the extraction and the purification of lycopene have always proved difficult.

It is also known that considerable quantities of carotenoids can be prepared by the submerged culture of certain microorganisms. More particularly, it is possible to obtain β-carotene in excellent yields by submerged fermentation of microorganisms of the genus Blakeslea, e.g. *Blakeslea trispora*, and it is known that the production of β-carotene is improved by the simultaneous culture of the opposite forms (known as the + and − forms respectively) of the species. It has also been shown that the addition of whole or hydrolysed seeds, of vegetable oils, of surface active agents, of anti-oxidants, and of thickening agents increases the β-carotene yield (R. Anderson et al., J. Agr. Food Chem. 6, 543 (1958) and A. Ciegler et al., App. Microb. 7, 94 and 98 (1959)). Anderson et al. (loc. cit.) have also noted that the addition of β-ionone to the static culture of a Blakeslea greatly increases the formation of β-carotene, to the detriment of other carotenoid pigments. This precursor may be replaced by other compounds such as 2,2,6-trimethylcyclohexanone or certain of its functional derivatives (U.S. Ser. No. 262,369, filed Mar. 4, 1963 and now U.S. Patent 3,242,054) or 2,2,6-trimethyl-1-acetylcyclohexene (U.S. Ser. No. 383,984, filed July 20, 1964 and now U.S. Patent 3,276,970).

It has now been found that, by introducing certain nitrogenous substances into culture media of *Blakeslea trispora* suitable for the production of β-carotene, it is possible to inhibit the formation of the latter in favour of the formation of lycopene. The media thus obtained have high lycopene contents, which have hitherto been unobtainable, and are more or less completely free from any other carotenoid product. The extraction and the purification of lycopene are thus greatly facilitated. The nitrogenous compounds which have this effect are the 5- and 6-membered mononuclear heterocycles containing the linkage:

e.g. imidazole, pyridine, morpholine and their substitution derivatives.

According, therefore, to the present invention, a process for the production of lycopene comprises aerobically cultivating the + and − forms of *Blakeslea trispora* (NRRL 2456 and 2457) in a nutrient medium containing a mononuclear heterocyclic compound containing the following ring skeleton:

wherein A represents a residue making up a 5- or 6-membered mononuclear ring.

Ordinarily A is —C—, —N—, —C—C—, —C—O—, or —O—C—. The ring may be saturated or unsaturated, including aromatically unsaturated, and may also be unsubstituted or substituted by, e.g., up to 3 alkyl groups of 1 to 4 carbon atoms each, an oxo group (when A contains nitrogen or oxygen), or an alkanoylamino group of up to 4 carbon atoms. However, it is within the scope of the invention to use compounds in which two such rings are joined together by a single bond or a methylene or carbonyl group. Preferred compounds containing such rings are imidazole, mono- and di-(lower alkyl) imidazoles, e.g. 1-methyl-imidazole, 2-methyl-imidazole, 2-isopropylimidazole, and 1-ethyl-2-methyl-imidazole, pyridine, and mono-, di-, and tri-(lower alkyl) pyridines, e.g., 2-methyl-, 2,4- and 2,6-dimethyl- and 2,4,6-trimethylpyridine, (lower alkanoyl) amino-imidazoles, e.g., 2-acetylamino-imidazole, morpholine, piperidine, creatinine, and compounds in which two such heterocyclic nuclei are linked directly or via a carbonyl group, e.g. 1,1′-carbonyldiimidazole and 2-(4-pyridyl)imidazole. (By "lower alkyl" and "lower alkanoyl" is meant alkyl and alkanoyl of 1 to 4 carbon atoms.)

These heterocyclic compounds may be added, in one or more fractions to the culture medium in quantities varying from 0.01 to 4 g. per litre, at the beginning of, or during, the fermentation. Preferably, the addition is made at the beginning of the culture. Regardless of the quantity of the heterocyclic compound added, and the time when it is added, it is desirable to continue the culture for 6 to 10 days after the inoculation in order to obtain maximum production of lycopene.

The exact composition of the culture medium may vary, but essentially it contains assimilable sources of carbon, nitrogen, mineral elements, and, optionally, growth factors, anti-oxidants, surface-active agents, and thickening agents. Addition of the precursors of the kinds mentioned above, while possible, is rarely advantageous.

As assimilable carbon source, there may be used carbohydrates such as glucose, dextrins or starch, or animal or vegetable oils, such as lard, soya bean oil, or cottonseed oil. The assimilable nitrogen source may be a pure chemical substance or a complex substance containing nitrogen mainly in protein form, e.g. casein, lactalbumin, gluten and their hydrolysates, soya bean and peanut flours, yeast extracts, distillers' solubles and corn-steep liquor.

Some of the mineral elements added, such as alkali metal or alkaline-earth phosphates, may have a buffering or neutralising effect.

One of the most frequently employed and most valuable of the growth factors is vitamin $B_1$ or thiamine. The anti-oxidants include N,N′-diphenyl-para-phenylenediamine, 2,2,4-trimethyl-6-ethoxy-1,2-dihydroquinoline, ascorbic acid and sorbic acid. The surface-active agents are preferably of the non-ionic type, such as derivatives of sorbitol with fatty acids, or products based upon condensates of ethylene oxide. The most commonly employed thickeners are starch, carboxymethylcellulose and agar.

The following examples illustrate the invention.

*Example 1*

Culture medium A is prepared as follows: 500 cc. of water containing 60 g. of distillers' solubles are boiled for 15 minutes. After cooling, the following are added: starch (60 g.); soya bean oil (35 cc.); cotton oil (35 cc.); yeast extract (1. g.); monopotassium phosphate (0.5 g.); manganese sulphate, monohydrate (0.1 g.); and thiamine hydrochloride (0.01 g.). The volume is made up to 1,000 cc. with distilled water. The mixture is adjusted to a pH of 6.3 with a few drops of 10 N sodium hydroxide, distributed in 300-cc. Erlenmeyer flasks, 50 cc. per flask, and then sterilised for 20 minutes at 120° C. After sterilisation and cooling, 0.5 cc. of a solution of 2,2,4 - trimethyl - 6 - ethoxy - 1,2 - dihydroquinoline in petroleum, in a concentration of 5% is introduced under sterile conditions into each flask.

Media B, C and D are also prepared in the same way as medium A, but after sterilisation, in addition to the petroleum and the anti-oxidants, the quantities of imidazole mentioned below are added to each flask, as aqueous solutions neutralised with dilute hydrochloric acid and filtered under sterile conditions.

Medium B: 0.1 cc. of a sterile 2.5% imidazole solution in water.

Medium C: 0.25 cc. of a sterile 20% imidazole solution, in water.

Medium D: 1 cc. of a sterile 20% imidazole solution, in water.

Each flask of the media A, B, C, and D is then inoculated with 5 cc. of an agitated culture containing the + and − forms of *Blakeslea trispora* (NRRL 2456 and NRRL 2457), 48 hours old. The flasks are placed on a shaking table rotating at 220 r.p.m. in an oven at 26° C.

After incubation for 2 days, 0.5 cc. of petroleum is added to each flask under sterile conditions. The cultures are continued under the same conditions of temperature and agitation for 8 further days. At the end of this time, the production of $\beta$-carotene or lycopene is maximum in all the flasks.

The determination of the $\beta$-carotene and of the lycopene contents is effected as follows. The mycelium is separated by filtration, washed with water and then dried over-night at 35° C. in vacuo. The dry mycelium is then extracted with hexane, and the extract is chromatographed through alumina. The fractions containing $\beta$-carotene and lycopene are collected separately. The $\beta$-carotene and lycopene contents of the solutions thus separated are determined by spectrophotometry by reference to a standard.

The above cultures give the following results:

| Medium | Imidazole in g./l. | Productions in mg. per litre of culture medium. | |
|---|---|---|---|
| | | Lycopene | $\beta$-Carotene |
| A | 0 | 30 | 670 |
| B | 0.05 | 560 | 410 |
| C | 1 | 750 | 20 |
| D | 4 | 545 | 0 |

*Example 2*

Culture medium E is prepared as follows. 500 cc. of water containing 75 g. of distillers' solubles are boiled for 15 minutes. After cooling, the following are added: starch (60 g.); soya bean oil (30 cc.); cotton oil (30 cc.); "Tween 80" (5 g.); yeast extract (1 g.); monopotassium phosphate (0.5 g.); manganese sulphate, monohydrate (0.1 g.) and thiamine hydrochloride (0.01 g.). ("Tween" is a Registered Trade Mark.) The volume is made up to 1,000 cc. with distilled water. The pH of the mixture is adjusted to 6.3 and the medium is distributed in 300 cc. Erlenmeyer flasks and sterilised as in Example 1.

After sterilisation, 0.5 cc. of a sterile 1% solution of 2,2,4 - trimethyl - 6 ethoxy - 1,2 - dihydroquinoline in petroleum is introduced into each flask under sterile conditions. After this addition, the flasks are separated into two equivalent lots. The first lot is left as it is, and into each flask of the second lot there is introduced 1 cc. of a neutral, sterile 5% imidazole solution in water. The flasks are then inoculated and incubated as described in Example 1. After incubation for 2 days, 0.5 cc. of petroleum and 1 cc. of a neutral and sterile 5% imidazole solution in water are added under sterile conditions to each flask of the first lot, and 0.5 cc. of petroleum is added to each flask of the second lot. After these additions, the cultures are continued for 8 further days under the same temperature and agitation conditions.

Determination of the $\beta$-carotene and lycopene contents as described in Example 1 gives the following results:

| Addition of imidazole (1 g./l.) | Productions in mg./l. | |
|---|---|---|
| | Lycopene | $\beta$-Carotene |
| At inoculation | 590 | 25 |
| After 2 days of culture | 540 | 75 |

*Example 3*

Culture media A and C, which differ only by the presence or absence of imidazole, are prepared and inoculated as described in the Example 1. After incubation for 2 days under the conditions described, the flasks of each culture medium are divided into two equivalent lots: $A_1$ and $A_2$, $C_1$ and $C_2$. Each flask then receives the following additions under sterile conditions.

Lot $A_1$: 0.5 cc. of petroleum.

Lot $A_2$: 50 mg. of $\beta$-ionone in solution in 0.5 cc. of petroleum.

$C_1$: 0.5 cc. of petroleum.

$C_2$: 50 mg. of $\beta$-ionone in solution in 0.5 cc. of petroleum.

After these additions, the cultures are continued for 8 further days under the same temperature and agitation conditions. Determination of the $\beta$-carotene and lycopene contents as described in Example 1 gives the following results:

| Lots | Imidazole, g./l. | $\beta$-Ionone, g./l. | Productions in mg./l. | |
|---|---|---|---|---|
| | | | Lycopene | $\beta$-Carotene |
| $A_1$ | 0 | 0 | 30 | 670 |
| $C_1$ | 1 | 0 | 750 | 20 |
| $A_2$ | 0 | 1 | 25 | 1,220 |
| $C_2$ | 1 | 1 | 715 | 45 |

*Example 4*

Culture medium A as described in Example 1 and a culture medium F, having the same constituents as medium A, but with the addition to each flask, after sterilisation and in addition to the petroleum and the anti-oxidant, of 150 mg. of 1,1' - carbondiimidazole in solid form, are prepared and distributed in 300-cc. Erlenmeyer flasks.

The flasks of media A and F are inoculated and incubated under the conditions described in Example 1. After incubation for two days, 0.5 cc. of petroleum is introduced into each flask under sterile conditions, and the cultures are continued for 8 further days under the same agitation and temperature conditions. The contents of $\beta$-carotene and lycopene are determined as described in Example 1. The following results are obtained:

| Medium | Carbonyldiimidazole (g./l.) | Productions in mg./l. | |
|---|---|---|---|
| | | Lycopene | $\beta$-Carotene |
| A | 0 | 20 | 555 |
| F | 3 | 400 | 0 |

Example 5

Culture medium A is prepared as described in Example 1. A medium G and a medium H are also prepared having the same constituents as medium A, but with the addition to each flask, after sterilisation and in addition to the petroleum and the anti-oxidant, of 2-methylimidazole: 0.1 cc. of a sterile 0.5% solution in water, in the flasks of medium G, and 0.5 cc. of a sterile 2% solution in water, in the flasks of medium H.

The flasks of media A, G and H are inoculated and incubated under the conditions described in Example 1. After incubation for 2 days, 0.5 cc. of petroleum is introduced under sterile conditions into each flask, and the cultures are continued for 8 further days under the same conditions of agitation and temperature. Determination of contents of the $\beta$-carotene and lycopene in the manner described above gives the following results:

| Medium | 2-methylimidazole (g./l.) | Productions in mg./l. | |
|---|---|---|---|
| | | Lycopene | $\beta$-Carotene |
| A | 0 | 40 | 900 |
| G | 0.01 | 855 | 180 |
| H | 0.2 | 760 | 0 |

Example 6

Medium A as described in Example 1 is prepared in 300-cc. Erlenmeyer flasks. Media K and L are also prepared in the same way as medium A, but after sterilisation and the addition of the anti-oxidant and the petroleum, creatinine is added in the following quantities to each flask.

Medium K: 0.5 cc. of a sterile 1% creatinine solution in water.

Medium L: 1 cc. of a sterile 15% creatinine solution in water.

The flasks of media A, K and L are inoculated and incubated for 10 days under the conditions described in Example 1, including the addition of petroleum at the end of 2 days of culture. The productions of $\beta$-carotene and lycopene obtained are as follows:

| Medium | Creatinine, g./l. | Productions in mg./l. | |
|---|---|---|---|
| | | Lycopene | $\beta$-Carotene |
| A | 0 | 20 | 555 |
| K | 0.1 | 640 | 510 |
| L | 3 | 780 | 55 |

Example 7

Medium A as described in Example 1 is prepared in 300-cc. Erlenmeyer flasks. Media M and N are prepared in the same way as medium A, but, after sterilisation and in addition to the petroleum and the anti-oxidant, pyridine is introduced into each flask in the following quantities:

Medium M: 0.5 cc. of a sterile 1% pyridine solution in water.

Medium N: 1 cc. of a sterile 15% pyridine solution in water.

The flasks of media A, M and N are inoculated and incubated for 10 days under the conditions described in Example 1, including the addition of petroleum after 2 days of culture. The productions of $\beta$-carotene and lycopene are as follows:

| Medium | Pyridine | Productions in mg./l. | |
|---|---|---|---|
| | | Lycopene | $\beta$-Carotene |
| A | 0 | 20 | 555 |
| M | 0.1 | 140 | 630 |
| N | 3 | 760 | 25 |

Example 8

Culture medium A is prepared as described in Example 1. Media P and R are also prepared in the same way as medium A, but after sterilisation and in addition to the petroleum and the anti-oxidant, morpholine is added in the following quantities to each flask:

Medium P: 0.50 cc. of a sterile 1% morpholine solution in water.

Medium R: 1 cc. of a sterile 15% morpholine solution in water.

The flasks of media A, P and R are inoculated and incubated for 10 days under the conditions described in Example 1, including the addition of petroleum at the end of 2 days. The $\beta$-carotene and lycopene contents are determined by the method described in Example 1. The following productions are obtained:

| Medium | Morpholine, g./l. | Production in mg./l. | |
|---|---|---|---|
| | | Lycopene | $\beta$-Carotene |
| A | 0 | 20 | 555 |
| P | 0.1 | 30 | 790 |
| R | 3 | 115 | 225 |

Example 9

The culture medium A described in Example 1 and culture media S and SA, are distributed in 300-cc. Erlenmeyer flasks, 50 cc. per flask, the latter media having the same constituents as medium A, but with the addition to each flask, after sterilisation and in addition to the petroleum and the anti-oxidant, of the following:

Medium S: 1 cc. of a sterile 5% 1-ethyl-2-methylimidazole solution in water.

Medium SA: 1 cc. of a sterile 5% 2-(4-pyridyl)imidazole solution in water.

The flasks of the three media are then inoculated and incubated under the conditions described in Example 1. After incubation for 2 days, 0.5 cc. of petroleum is added under sterile conditions to each flask, and the cultures are continued for 9 to 10 days more under the same conditions of agitation and temperature. The $\beta$-carotene and the lycopene contents are then determined as described in Example 1. The following results are obtained:

| Medium | Addition | | Production in mg./l. | |
|---|---|---|---|---|
| | Compound | Amount g./l. | Lycopene | $\beta$-Carotene |
| A | None | | 35 | 935 |
| S | 1-ethyl-2-methyl-imidazole. | 1 | 865 | 20 |
| SA | 2-(4-pyridyl)-imidazole. | 1 | 990 | 155 |

Culture medium T is prepared as follows: 500 cc. of water containing 75 g. of distillers' solubles are boiled for 15 minutes. After cooling, the following are added: starch (70 g.); soya bean oil (40 cc.); cotton oil (40 cc.); monopotassium phosphate (0.5 g.); manganese sulphate, monohydrate (0.2 g.); and thiamine hydrochloride (0.01 g.). The volume is made up to 1000 cc. with distilled water. The pH of the mixture is adjusted to 6.3 and the medium is distributed in 300 cc. Erlenmeyer flasks, 50 cc. per flask, and sterilised as described in Example 1.

After sterilisation, 1 cc. of a sterile 2.5% solution of 2,2,4-trimethyl-6-ethoxy-1,2-dihydroquinoline in petroleum is added to each flask.

A medium TA and a medium TB are also prepared with the same constituents as medium T, but, after sterilisation, in addition to the petroleum and the anti-oxidant: 1 cc. of a sterile 5% 2-acetylaminoimidazole solution in water is added to each flask of medium TA; and 1 cc. of a sterile 5% 1-methylimidazole solution in water is added to each flask of medium TB.

The flasks of media T, TA and TB are inoculated and incubated under the conditions described in Example 1. After 12 days of culture without any further addition, the β-carotene and the lycopene contents are determined as described in Example 1. The following results are obtained:

| Medium | Additions | | Productions in mg./l. | |
|---|---|---|---|---|
| | Compound | Amount g./l. | Lycopene | β-Carotene |
| T | None | | 40 | 1080 |
| TA | 2-acetylamino-imidazole. | 1 | 860 | 95 |
| TB | 1-methyl-imidazole. | 1 | 820 | 60 |

Example 11

The culture medium T described in Example 10 and a culture medium TC having the same constituents as medium T, but with the addition to each flask, after sterilisation and addition of the petroleum and the anti-oxidant, of 0.1 cc. of a sterile 5% 2-isopropylimidazole solution in water, are prepared.

The flasks of media T and TC are inoculated and incubated under the conditions described in Example 1. After 10 days of culture without any further addition, the β-carotene and the lycopene contents are determined as described in Example 1. The following results are obtained:

| Medium | 2-Isopropylimid-azole g./l. | Production in mg./l. | |
|---|---|---|---|
| | | Lycopene | β-Carotene |
| T | 0 | 40 | 985 |
| TC | 0.1 | 845 | 0 |

Example 12

Culture medium A is prepared as described in Example 1. A culture medium V and a medium W having the same constituents as medium A are also prepared, with the addition to each flask, after sterilisation and addition of the petroleum and the anti-oxidant, of the following:

Medium V: 0.5 cc. of a sterile 10% solution of 2,4-dimethylpyridine in water;

Medium W: 0.5 cc. of a sterile 10% 2,4,6-trimethyl-pyridine solution in water.

The flasks of media A, V and W are inoculated and incubated under the conditions described in Example 1. After incubation for 2 days, 0.5 cc. of petroleum is added to each flask of the three media under sterile conditions, and the cultures are continued for 8 more days under the same agitation and temperature conditions.

On determination of the β-carotene and of the lycopene contents in the manner described in Example 1, the following results are obtained:

| Medium | Additions | | Production in mg./l. | |
|---|---|---|---|---|
| | Compound | Amount g./l. | Lycopene | β-Carotene |
| A | None | | 25 | 410 |
| V | 2,4-dimethyl-pyridine. | 1 | 850 | 35 |
| W | 2,4,6-trimethyl-pyridine. | 1 | 800 | 30 |

Example 13

Culture medium A is prepared as described in Example 1. Media X and Y are prepared in the same way, the following additional constitutents being added to each flask, after sterilisation and in addition to the petroleum and the anti-oxidant:

Medium X: 0.5 cc. of a sterile 10% 2,6-dimethylpyridine solution in water;

Medium Y: 0.5 cc. of a sterile 10% 2-methylpyridine solution in water.

Each flask of media A, X and Y is inoculated and incubated under the conditions described in Example 1. After 2 days of culture 0.5 cc. of petroleum is added to each flask under sterile conditions and the cultures are continued for 8 further days under the same agitation and temperature conditions.

The β-carotene and the lycopene contents are determined as described in Example 1, and the following results are obtained:

| Medium | Additions | | Production in mg./l. | |
|---|---|---|---|---|
| | Compound | Amount g./l. | Lycopene | β-Carotene |
| A | None | | 15 | 720 |
| X | 2,6-dimethyl-pyridine. | 1 | 920 | 15 |
| Y | 2-methyl-pyridine. | 1 | 800 | 0 |

Example 14

The culture medium T described in Example 10 and a culture medium TD are prepared, the latter having the same constituents as Medium T, but with the addition to each flask, after sterilisation and addition of the petroleum and the anti-oxidant, of 0.2 cc. of a sterile 25% piperidine solution in water.

The flasks of media T and TD are inoculated and incubated under the condition described in the Example 1. After 11 days of culture without further addition, the β-carotene and the lycopene contents are determined as described in Example 1. The following results are obtained:

| Medium | Piperidine in g./l. | Production in mg./l. | |
|---|---|---|---|
| | | Lycopene | β-Carotene |
| T | 0 | 40 | 740 |
| TD | 1 | 1030 | 205 |

We claim:
1. Process for the production of lycopene which comprises aerobically cultivating the + and − forms of *Blakeslea trispora* (NRRL 2456 and 2457) in a nutrient medium containing an effective amount of a heterocyclic compound selected from the class consisting of imidazole, mono- and di(lower alkyl)imidazoles, pyridine, mono-, di- and tri-(lower alkyl)pyridines, (lower alkanoyl) aminoimidazole, morpholine, piperidine, creatinine, compounds in which two such heterocyclic nuclei are linked by a single bond, and compounds in which two such heterocyclic nuclei are linked by a carbonyl group, and recovering lycopene from the said medium.

2. Process according to claim 1, wherein the heterocyclic compound is present in an amount from 0.01 to 4 g. per litre of nutrient medium.

3. Process according to claim 1, wherein the nutrient medium also contains thiamine.

4. Process according to claim 1, wherein the nutrient medium also contains 2,2,4-trimethyl-6-ethoxy-1,2-dihydroquinoline.

References Cited

UNITED STATES PATENTS 3,097,146  7/1963  Swarthout _____ 195—28 X
3,242,054  3/1966  Ninet et al. _____ 195—28

ALVIN E. TANENHOLTZ, *Primary Examiner.*